US007280603B2

(12) United States Patent
Jeong et al.

(10) Patent No.: US 7,280,603 B2
(45) Date of Patent: Oct. 9, 2007

(54) DSL RECEIVERS FOR TCM-ISDN ENVIRONMENTS AND METHODS OF OPERATING SAME

(75) Inventors: Jun-Young Jeong, Kyunggi-do (KR); Dong-Hee Han, Kyunggi-do (KR)

(73) Assignee: Samsung Electronics Co., Ltd. (KR)

( * ) Notice: Subject to any disclaimer, the term of this patent is extended or adjusted under 35 U.S.C. 154(b) by 791 days.

(21) Appl. No.: 10/391,871

(22) Filed: Mar. 19, 2003

(65) Prior Publication Data

US 2003/0219076 A1    Nov. 27, 2003

(30) Foreign Application Priority Data

May 22, 2002    (KR) ............................... 2002-28477

(51) Int. Cl.
*H04L 27/28* (2006.01)
(52) U.S. Cl. .................................................. 375/260
(58) Field of Classification Search ................ 375/260, 375/259, 316, 354, 357, 362, 371, 372, 377, 375/373, 375; 370/503, 509, 510, 512, 498, 370/464; 379/399.01, 399.02
See application file for complete search history.

(56) References Cited

U.S. PATENT DOCUMENTS

| | | | | |
|---|---|---|---|---|
| 6,751,261 B1 * | 6/2004 | Olsson et al. | ............... | 375/260 |
| 6,912,261 B2 * | 6/2005 | Aslanis et al. | ............... | 375/364 |
| 6,965,617 B2 * | 11/2005 | Hasegawa et al. | .......... | 370/503 |
| 7,075,997 B1 * | 7/2006 | Duncan | ...................... | 375/260 |

FOREIGN PATENT DOCUMENTS

KR    10-2003-60312 A    7/2003

OTHER PUBLICATIONS

Notice to Submit Response, Korean Application No. 2002-28477, Jul. 5, 2004.

* cited by examiner

*Primary Examiner*—Pankaj Kumar
(74) *Attorney, Agent, or Firm*—Myers Bigel Sibley & Sajovec (57) ABSTRACT

A digital subscriber line (DSL) receiver includes a discrete multitone (DMT) receiver circuit operative to receive a DSL signal and to generate signal samples corresponding to respective frequency division multiplexed tones of the DSL signal. The receiver further includes a synchronization circuit operative to determine phase information for a crosstalk source indication signal, e.g., an integrated services digital network (ISDN) timing reference indication signal, carried by one of the plurality of frequency-division multiplexed tones from the signal samples generated by the DMT receiver circuit and to determine frame timing for the DSL signal responsive to the determined phase information. The DMT receiver circuit may include a buffer operative to receive and store samples of the DSL signal, and a fast Fourier transformer (EFT) operative to generate the signal samples for the respective ones of the plurality of frequency-division multiplexed tones from the stored samples of the DSL signal. The synchronization circuit may be operative to control transfer of stored samples of the DSL signal from the buffer to the FFT responsive to the determined phase information.

31 Claims, 11 Drawing Sheets

| TTR | | | | | | | | | | | |
|---|---|---|---|---|---|---|---|---|---|---|---|
| 0 | 0 | 1 | 2 | 3 | 4 | 5 | 6 | 7 | 8 | 9 | |
| 1 | 10 | 11 | 12 | 13 | 14 | 15 | 16 | 17 | 18 | 19 | |
| 2 | 20 | 21 | 22 | 23 | 24 | 25 | 26 | 27 | 28 | 29 | |
| 3 | 30 | 31 | 32 | 33 | 34 | 35 | 36 | 37 | 38 | 39 | 40 |
| 4 | | 41 | 42 | 43 | 44 | 45 | 46 | 47 | 48 | 49 | 50 |
| 5 | | 51 | 52 | 53 | 54 | 55 | 56 | 57 | 58 | 59 | 60 |
| 6 | | 61 | 62 | 63 | 64 | 65 | 66 | 67 | SS | 69 | 70 |
| 7 | | 71 | 72 | 73 | 74 | 75 | 76 | 77 | 78 | 79 | 80 |
| 8 | | 81 | 82 | 83 | 84 | 85 | 86 | 87 | 88 | 89 | 90 |
| 9 | | 91 | 92 | 93 | 94 | 95 | 96 | 97 | 98 | 99 | 100 |
| 10 | 101 | 102 | 103 | 104 | 105 | 106 | 107 | 108 | 109 | 110 | 111 |
| 11 | | 112 | 113 | 114 | 115 | 116 | 117 | 118 | 119 | 120 | 121 |
| 12 | | 122 | 123 | 124 | 125 | 126 | 127 | 128 | 129 | 130 | 131 |
| 13 | | 132 | 133 | 134 | 135 | 136 | SS | 138 | 139 | 140 | 141 |
| 14 | | 142 | 143 | 144 | 145 | 146 | 147 | 148 | 149 | 150 | 151 |
| 15 | 152 | 153 | 154 | 155 | 156 | 157 | 158 | 159 | 160 | 161 | |
| 16 | 162 | 163 | 164 | 165 | 166 | 167 | 168 | 169 | 170 | 171 | 172 |
| 17 | | 173 | 174 | 175 | 176 | 177 | 178 | 179 | 180 | 181 | 182 |
| 18 | | 183 | 184 | 185 | 186 | 187 | 188 | 189 | 190 | 191 | 192 |
| 19 | | 193 | 194 | 195 | 196 | 197 | 198 | 199 | 200 | 201 | 202 |
| 20 | | 203 | 204 | 205 | SS | 207 | 208 | 209 | 210 | 211 | 212 |
| 21 | | 213 | 214 | 215 | 216 | 217 | 218 | 219 | 220 | 221 | 222 |
| 22 | 223 | 224 | 225 | 226 | 227 | 228 | 229 | 230 | 231 | 232 | |
| 23 | 233 | 234 | 235 | 236 | 237 | 238 | 239 | 240 | 241 | 242 | 243 |
| 24 | | 244 | 245 | 246 | 247 | 248 | 249 | 250 | 251 | 252 | 253 |
| 25 | | 254 | 255 | 256 | 257 | 258 | 259 | 260 | 261 | 262 | 263 |
| 26 | | 264 | 265 | 266 | 267 | 268 | 269 | 270 | 271 | 272 | 273 |
| 27 | | 274 | SS | 276 | 277 | 278 | 279 | 280 | 281 | 282 | 283 |
| 28 | 284 | 285 | 286 | 287 | 288 | 289 | 290 | 291 | 292 | 293 | |
| 29 | 294 | 295 | 296 | 297 | 298 | 299 | 300 | 301 | 302 | 303 | |
| 30 | 304 | 305 | 306 | 307 | 308 | 309 | 310 | 311 | 312 | 313 | 314 |
| 31 | | 315 | 316 | 317 | 318 | 319 | 320 | 321 | 322 | 232 | 324 |
| 32 | | 325 | 326 | 327 | 328 | 329 | 330 | 331 | 332 | 333 | 334 |
| 33 | | 335 | 336 | 337 | 338 | 339 | 340 | 341 | 342 | 343 | SS |

▓ FEXT$_R$ Frame  ☐ NEXT$_R$ Frame

DSL RECEIVERS FOR TCM-ISDN ENVIRONMENTS AND METHODS OF OPERATING SAME

RELATED APPLICATION

This application claims priority to Korean Patent Application 2002-28477, filed on May 22, 2002, the contents of which are herein incorporated by reference in their entirety.

BACKGROUND OF THE INVENTION

The present invention relates to communications systems and methods, and more particularly, to multicarrier communications systems and methods.

As demands for very high-speed communications applications, such as Internet applications, have increased, there has been a concomitant increase in demand for high-speed communication services that have relatively low installation and service charges. To meet those demands, various Digital Subscriber Line variants (xDSL) that use ordinary copper telephone lines installed in existing houses and offices have been offered and/or proposed. xDSL services include high data-rate DSL (HDSL) substituted for the existing T1 line, symmetric DSL (SDSL) substituted for T1 or E1 using one twisted-pair copper line, and asymmetric DSL (ADSL) capable of transmitting large-capacity data in a public switched telephone network (PSTN) environment.

ADSL is "asymmetric" in that greater bandwidth and larger amounts of data are transmitted downstream from a central office (CO) to a remote terminal (RT) than from the remote terminal to a central office. In typical ADSL applications, which often use existing telephone lines, it is possible to communicate data at a high speed and plain old telephone service (POTS) at the same time. A typical transmission rate for ADSL is 8 Mbps in the downstream direction and 640 kbps in the upstream direction.

Unfortunately, however, a modulated signal, such as a DSL carrier, can transfer electromagnetic energy to adjacent copper lines disposed within the same cable bundle. A cross coupling of such electromagnetic energy is called "crosstalk." In a typical telephone network, a pair of insulated copper lines is bound with what is referred to as a "cable binder." Adjacent channels that are carried on conductors disposed within the same cable binder and which transmit and/or receive information within the same frequency range often generate significant crosstalk. As a result, received signals may be somewhat altered from originally transmitted waveforms.

Such crosstalk can be classified into two types, near end crosstalk (NEXT) and far end crosstalk (FEXT). NEXT typically is more significant because high energy signals generated from a transmitter at one end of a cable can causes very large crosstalk in a signal received by a receiver coupled to the same end of the cable. In contrast, FEXT is generated by equipment disposed at the opposite terminal of the cable, and is generally smaller than the NEXT because the copper line typically attenuates remotely generated interference.

A Time Compression Multiplexing Integrated Service Digital Network (TCM-ISDN) repeatedly performs upstream and downstream transmissions of data during periods of a so-called TCM timing reference (TTR). During a first half period of the TTR, the ISDN central office transmits data to the ISDN remote terminal. During the second half period of the TTR, the ISDN remote terminal transmits data to the ISDN central office. In TCM-ISDN, sources of NEXT and FEXT noises are often referred to as "TCM-ISDN interference."

In order to communicate in a TCM-ISDN environment, an ADSL transceiver typically transmits a large amount of data during periods when FEXT is the main source of interference and transmits a relatively small amount of data or no data during periods when NEXT is the main source of interference. One technique for reducing NEXT interference is called the dual bit-map (DBM) technique, wherein different bit-maps are used in respective FEXT and NEXT periods. Another technique is called the single bit-map (SBM) technique, wherein data is transmitted only during FEXT-dominant periods. Yet another technique is the so-called SNR technique that selectively uses DBM and SBM techniques based on signal to noise ratio measurements.

In applications where an ADSL service is provided in a TCM-ISDN environment, accurate network time synchronizations can be performed between the ADSL service and the TCM-ISDN service. Additionally, in case where data is transmitted using the DBM method, a transmission rate can be maximized. In the ADSL system under the environment of the TCM-ISDN, one frame is 250*(68/69) µs in length, i.e., about 246 µs. One frame is provided with a series of 345 frames and is 250*(68/69)*345 µS in length, i.e., 85 ms.

Among supplementary provisions of the ADSL modem standard, ADSL Annex C requires that the receiving side (i.e., the remote terminal) should adopt hyperframe synchronization with respect to a sending side (i.e., the central office) at the beginning of an initialization process. This hyperframe synchronization is typically carried out after frame synchronization is achieved. According to the ADSL Annex C, the central office simultaneously transmits a pilot tone of 276 kHz and a TTR indication tone of 207 kHz during the initialization process. It is determined whether a received frame is a FEXT frame or a NEXT frame from the phase of the indication tone. Accordingly, after frame synchronization is achieved and the remote terminal determines whether a received frame is a NEXT frame or a FEXT frame by analyzing the phase of the TTR indication tone, it is possible to determine a sequence number of the received frame in the hyperframe.

SUMMARY OF THE INVENTION

In some embodiments of the present invention, a digital subscriber line (DSL) receiver includes a discrete multitone (DMT) receiver circuit operative to receive a DSL signal and to generate signal samples corresponding to respective frequency division multiplexed tones of the DSL signal. The receiver further includes a synchronization circuit operative to determine phase information for a crosstalk source indication signal, e.g., an ISDN timing reference indication signal, carried by one of the plurality of frequency-division multiplexed tones from the signal samples generated by the DMT receiver circuit and to determine frame timing for the DSL signal responsive to the determined phase information. In particular, the DMT receiver circuit may include a buffer operative to receive and store samples of the DSL signal, and a fast Fourier transformer (FFT) operative to generate the signal samples for the respective ones of the plurality of frequency-division multiplexed tones from the stored samples of the DSL signal. The synchronization circuit may be operative to control transfer of stored samples of the DSL signal from the buffer to the FFT responsive to the determined phase information.

In further embodiments of the present invention, a DSL receiver includes: a decoder for converting signals within a time domain into a those within a frequency domain; a buffer for providing the decoder with signals received via the digital subscriber line along a frame boundary; and a frame synchronizer for performing a frame synchronization using a series of phase information. The frame synchronizer changes the frame boundary if there is phase information that corresponds to neither a first phase nor a second phase. The signals received via the digital subscriber line are TTR indication signal of 207 kHz and PILOT signal of 276 kHz. The frame boundary is changed by 32 samples, i.e., the least common multiple (LCM) of a period of the TTR indication signal and that of the PILOT signal.

In further embodiments of the present invention, the phase information outputted from the decoder is phase information of the TTR indication signal. The first phase is a phase corresponding to a far end crosstalk (FEXT) period and the second phase is a phase corresponding to a near end crosstalk (NEXT) period.

In other embodiments of the present invention, there is provided a receiver for receiving frame signals via a digital subscriber line disposed adjacent to a communication line of TCM-ISDN system. The receiver includes: an analog-to-digital converter for converting analog signals into digital signals; a first buffer for sequentially receiving and storing the digital signals outputted from the analog-to-digital converter and sequentially outputting serial digital signals in the stored order along frame boundary; a second buffer for converting the serial digital signals outputted from the first buffer into parallel digital signals; a fast Fourier transformer for converting the parallel digital signals within a time domain, which are outputted from the second buffer, into those within a frequency domain; and a frame synchronization circuit for receiving and storing a series of phase information outputted from the fast Fourier transformer and performing a frame synchronization using the stored phase information.

The frame synchronization circuit controls the frame boundary to be changed, if the stored phase information corresponds to neither a first phase nor a second phase. The frame synchronizer may include: a phase storage unit; and a frame synchronizer for storing the series of phase information outputted from the fast Fourier transformer into the phase storage unit, and controlling the frame boundary of the first buffer to be changed, if there is a phase information that corresponds to neither the first phase nor the second phase.

In further embodiments of the present invention, there is provided a frame synchronization method of a receiver receiving frame signals via a digital subscriber line disposed adjacent to a communication line of TCM-ISDN system. The method includes: (a) sequentially receiving a plurality of frames from a frame boundary; (b) detecting phase information of TTR indication signal contained in the respective received frames; (c) determining whether or not, among the detected phase information, there is phase information which corresponds to neither a first phase nor a second phase; (d) if there is the phase information which corresponds to neither the first phase nor the second phase, controlling the frame boundary to be changed by a predetermined time; and (e) repeating the steps (a) to (d) until all the detected phase information correspond to any one of the first phase and the second phase. In some embodiments of the present invention, in the step (d), the frame boundary is changed by 32 samples, i.e., the least common multiple (LCM) of a period of the TTR indication signal of 207 kHz and that of the PILOT signal of 276 kHz.

In other embodiments of the present invention, there is provided a frame synchronization method for a communication system having a plurality of frames and performing a communication via a digital subscriber line disposed adjacent to a communication line of a TCM-ISDN system. The method includes: (a) sequentially receiving the plurality of frames from a frame boundary; (b) storing phase information of TTR indication signal contained in the respective received frames; (c) defining the respective frames as any one of first and second types based on the stored phase information; (d) determining whether or not, among the frames, there is a frame which is not defined as the first and second types; (e) if there is the frame which is not defined as any one of the first and second types, controlling the frame boundary to be changed by a predetermined time; (f) repeating the steps (a) to (e) until all the frames are defined as any one of the first and second types; and (g) activating a frame synchronization signal when all the frames are defined as any one of the first and second types.

DETAILED DESCRIPTION

The present invention now will be described more fully with reference to the accompanying drawings, in which embodiments of the invention are shown. This invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like reference numerals refer to like elements throughout.

Figure 1:
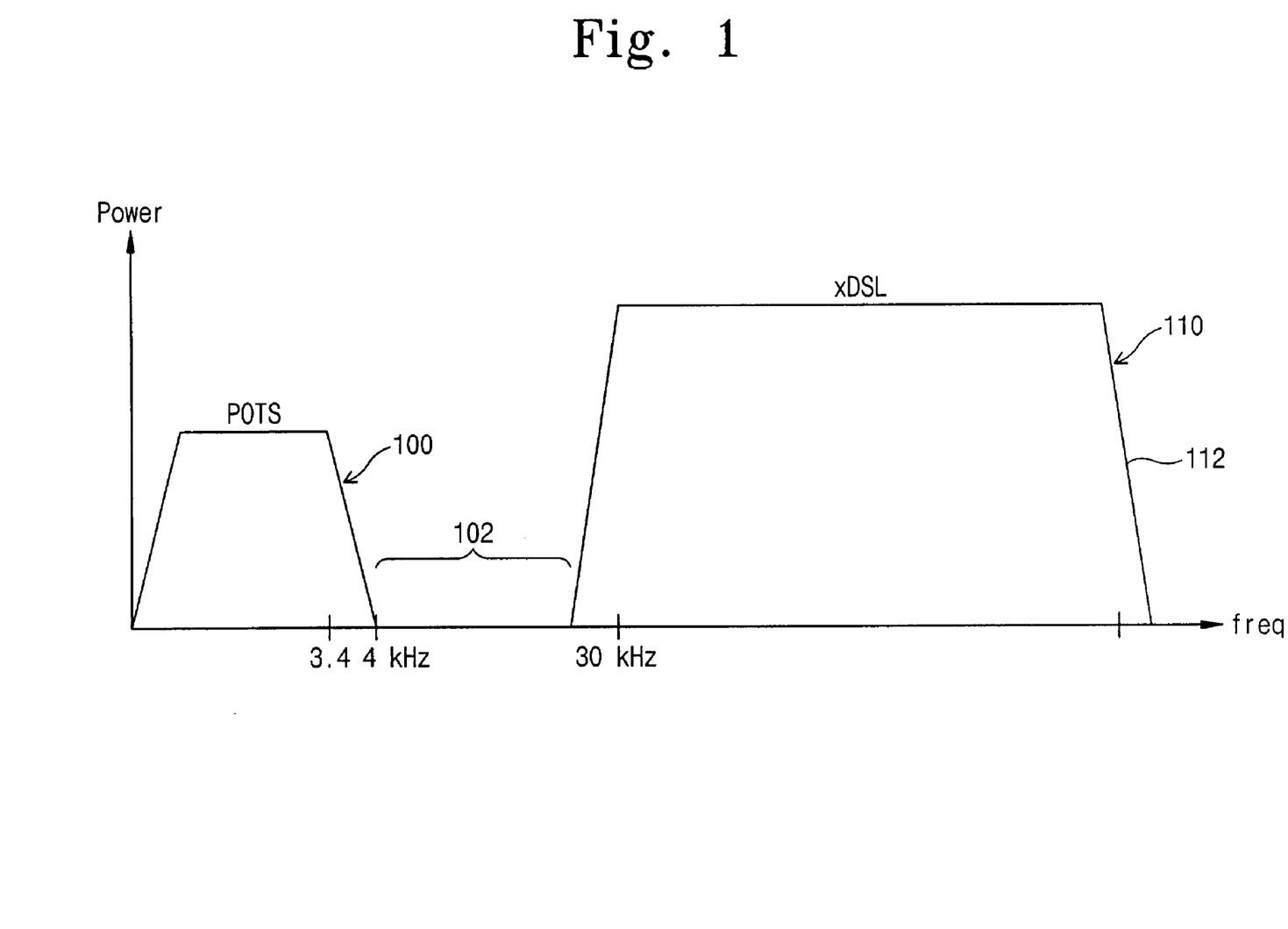
FIG. 1 is a view showing a spectrum allocation of a plain old telephone service (POTS) and an xDSL service.

FIG. 1 is a view showing a spectrum allocation of a plain old telephone service (POTS) and an xDSL service. In FIG. 1, horizontal and vertical axes represent frequency and power, respectively. As is well known, a typical POTS frequency band 100 is in the range of 0 Hz to 3.4 kHz. A typical xDSL frequency band 110 is in the range of 30 kHz to some upper frequency boundary 112. The upper boundary 112 typically depends on the type of xDSL technique employed. A separation or guard band 102 is provided to separate signals in the POTS frequency band 100 and the xDSL frequency band 110, so that the POTS and the xDSL service can coexist on the same wire.

Figure 2:
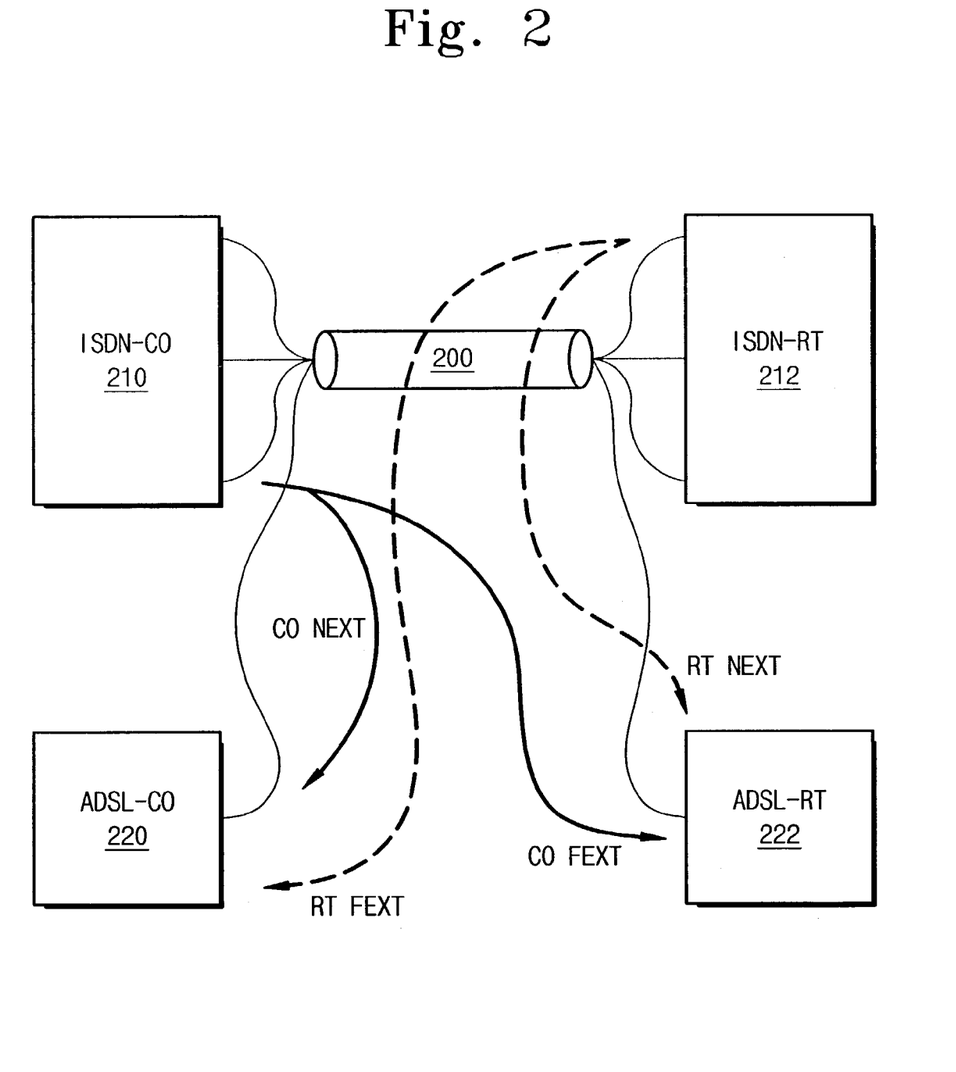
FIG. 2 shows a crosstalk effect when a transceiver of an ADSL central office is connected with that of an ADSL remote terminal via a cable bundle shared with TCM-ISDN links between an ISDN central office (ISDN-CO) and an ISDN remote terminal (ISDN-RT)

FIG. 2 shows a crosstalk effect when a transceiver of an ADSL central office is connected with a transceiver 222 of an ADSL remote terminal via a cable bundle 200 that is also used for TCM-ISDN links between an ISDN central office (ISDNCO) 210 and an ISDN remote terminal (ISDN-RT) 212. During a first half period of a TTR, which is indicated by a thick solid line, when information is transmitted from the ISDN central office 210 to the ISDN remote terminal 212, the ADSL central office 220 receives NEXT noise from the ISDN central office 210, and the ADSL remote terminal 222 receives FEXT noise from the ISDN central office 210. Because the ADSL remote terminal 222 receives FEXT noise in an ADSL downstream transmission between the ADSL central office 220 and the ADSL remote terminal 222, the first half period of the TTR is called a "FEXT period."

During a second half period of the TTR, which is indicated by a thick dotted line, when information is transmitted from the ISDN remote terminal 212 to the ISDN central office 210, the ASDL remote terminal 222 receives NEXT noise from the ISDN remote terminal 212, and the ADSL central office 220 receives FEXT noise from the ISDN remote terminal 212. Because the ADSL remote terminal 222 receives NEXT noise during an ADSL downstream transmission between the ADSL central office 220 and the ADSL remote terminal 222, the second half period of the TTR is called a "NEXT period." NEXT and FEXT periods are opposite for upstream transmission of data between the ADSL remote terminal 222 and the ADSL central office 220. This is because the ADSL central office 220 receives NEXT noise from the ISDN central office 210 during the first half period of the TTR and receives FEXT noise from the ISDN remote terminal 212 during the second half period of the TTR.

NEXT and FEXT noise typically affects performance of an ADSL system. During an initialization of a typical ADSL transmission link, the ADSL system typically estimates a noise level that influences the transmission link. In general, because the NEXT noise is typically greater than FEXT noise, throughput of the ADSL can be remarkably reduced. This reduction can become more serious as the transmission link is lengthened.

Figure 3:
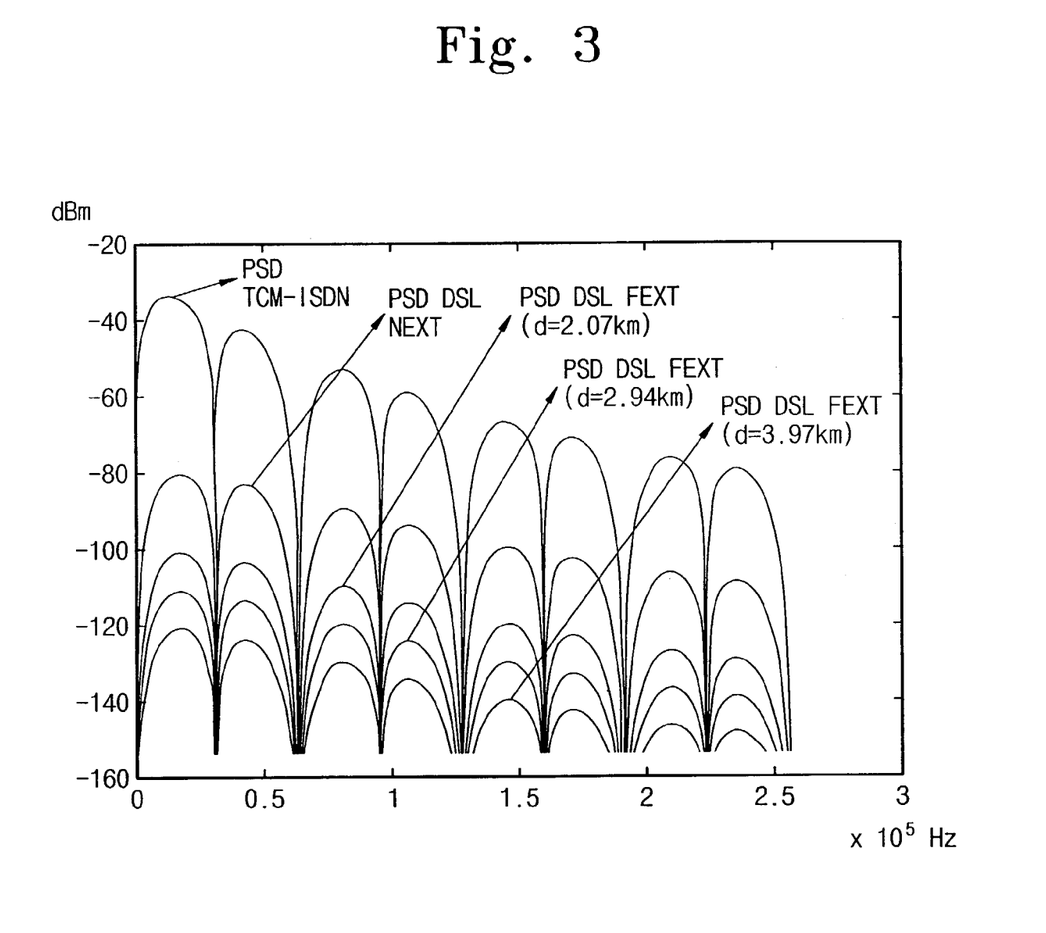
FIG. 3 shows a power spectral density of a TCM-ISDN signal and NEXT and FEXT power spectral densities of a DSL signal.

FIG. 3 shows power spectral density of a TCM-ISDN signal, and NEXT and FEXT power spectrum densities of an ADSL service. It can be seen that the intensity of the NEXT noise is generally greater than that of the FEXT noise, and the FEXT noise is attenuated as distance d increases. For example, when the distance between the ADSL central office 220 and the ADSL remote terminal 222 is 2.07 km, the FEXT noise is larger than that when a distance therebetween is 3.97 km.

Figure 4:
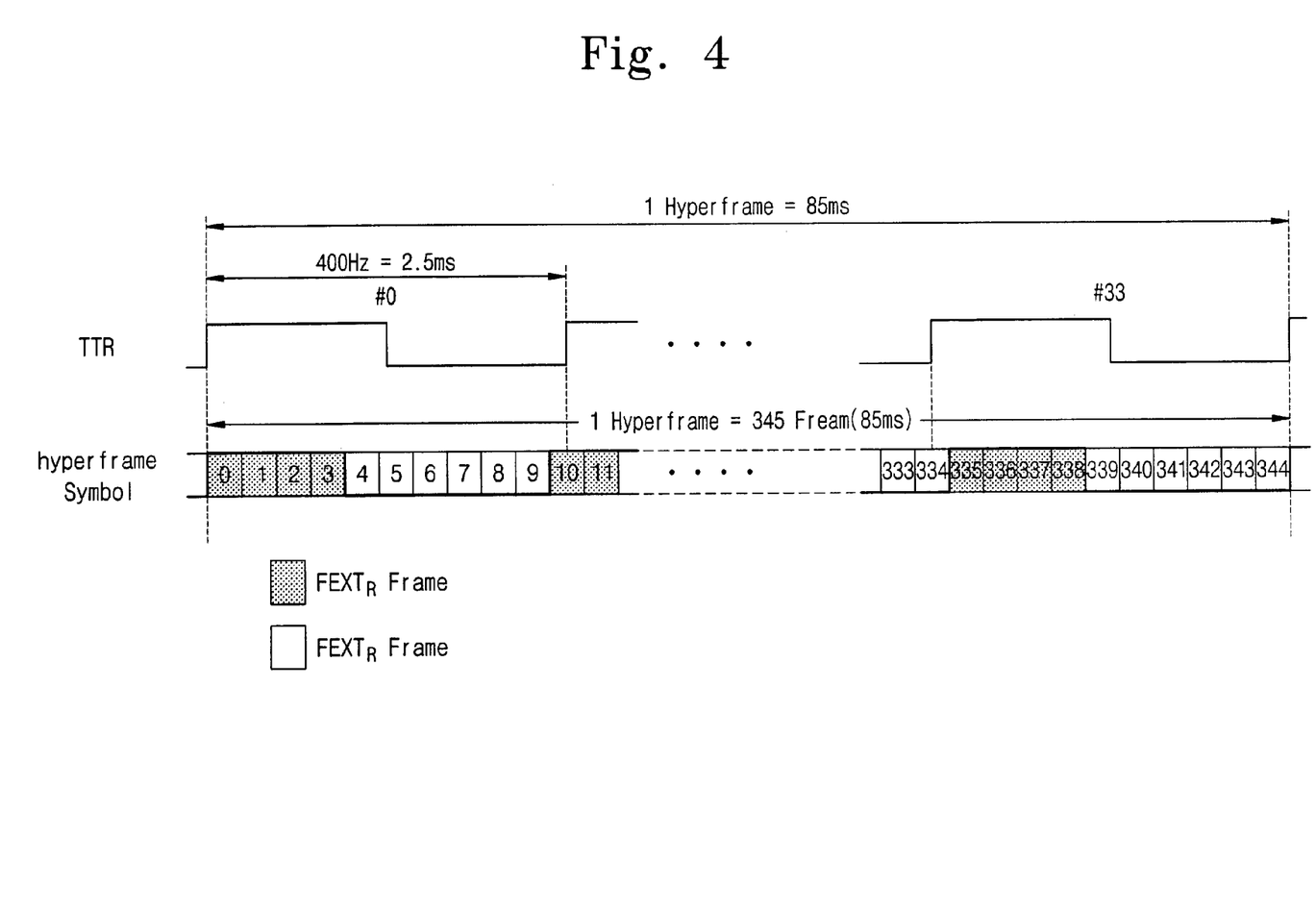
FIG. 4 illustrates a TTR signal used to transmit data between the ISDN central office and the ISDN remote terminal, and symbols transmitted from the ADSL central office to the ADSL remote terminal.

FIG. 4 illustrates an exemplary TTR signal used for data transmission between the ISDN central office 210 and the ISDN remote terminal 212, and symbols (i.e., frames) transmitted from the ADSL central office 220 to the ADSL remote terminal 222. As shown, the frequency of the TTR signal is 400 Hz (2.5 ms), and a length of a standard DMT frame is 246.3768 ms. Therefore, the TTR signal is synchronized with 345 frames once every 34 periods. The 345 frames that coincide with 34 periods of the TTR signal are called a "hyperframe."

Figure 5:
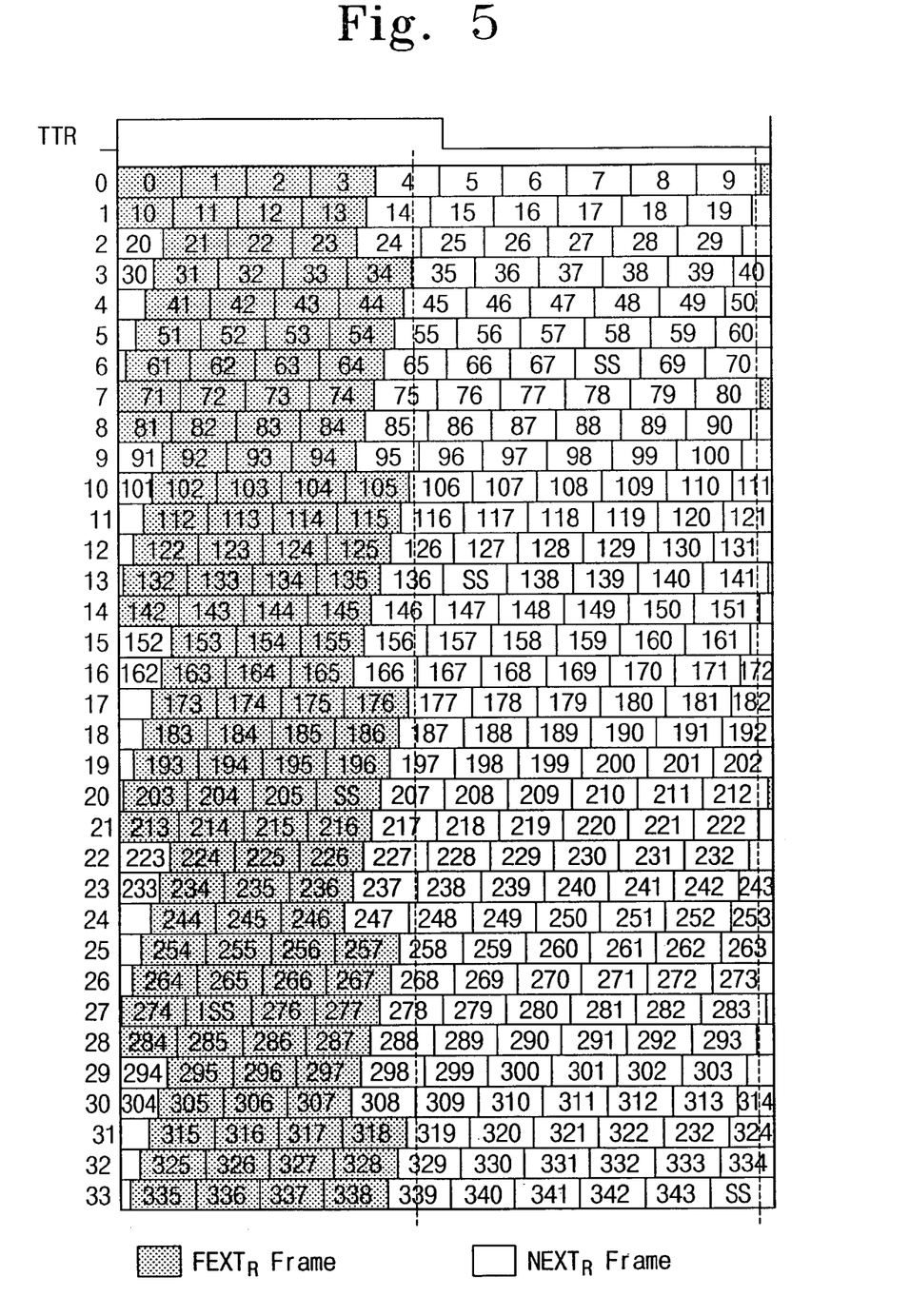
FIG. 5 is a table showing one hyperframe of an ADSL signal during 34 periods of a TTR signal.

FIG. 5 is a table showing 1 hyperframe of an ADSL signal during 34 periods of a TCM-ISDN TTR signal. In FIG. 5, shaded portions represent frames corresponding to FEXT periods, while unshaded portions represent frames corresponding to NEXT periods. In FIG. 5, a criterion for determining whether frames are FEXT or NEXT frames is determined by a vertical dotted line.

The ADSL remote terminal 222 can correctly decode the signal transmitted from the ADSL central office 220 when it is correctly determined whether the signal received from the ADSL central office 220 is a signal within a FEXT period or a signal within a NEXT period.

Figure 6:
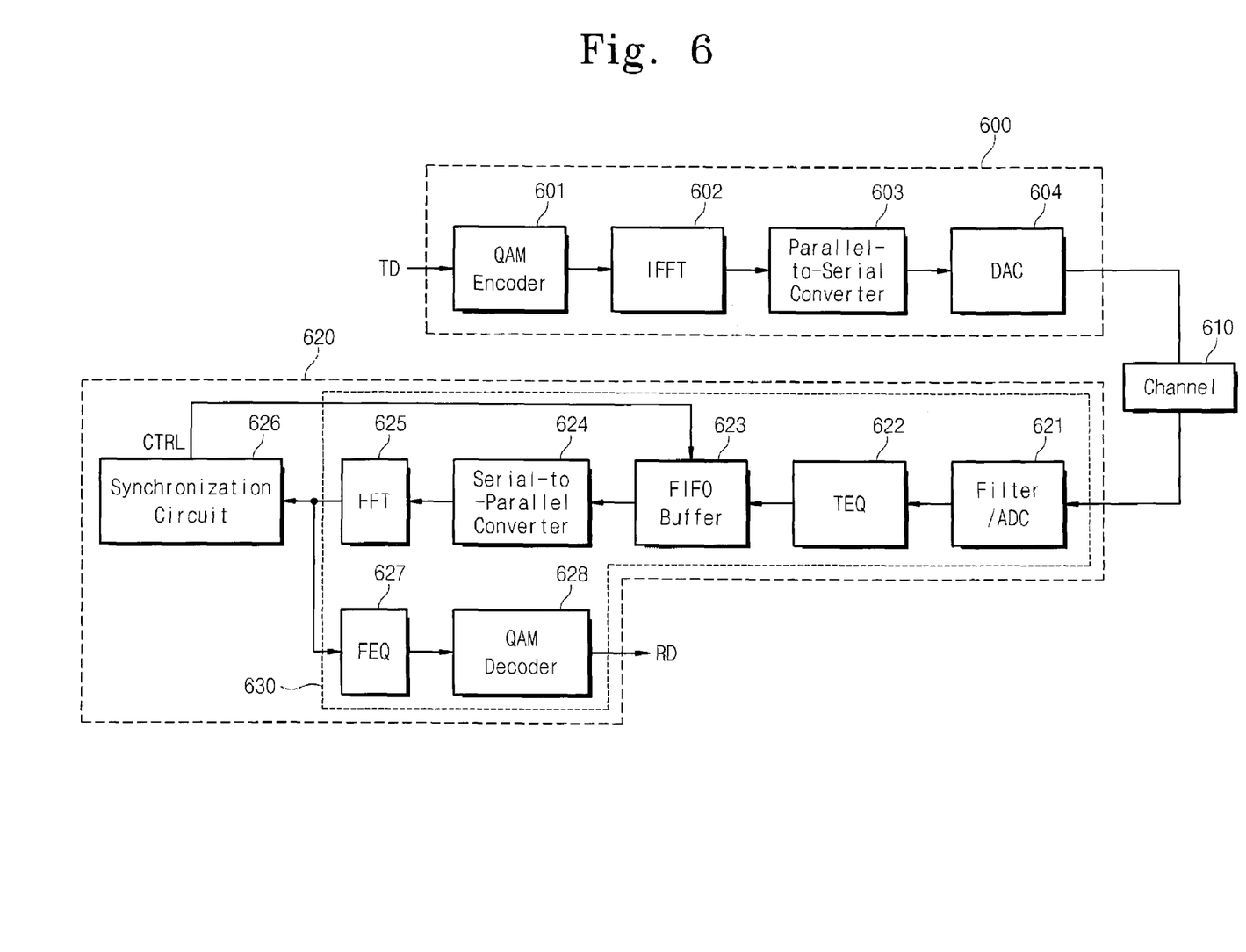
FIG. 6 is a view showing a structure of a transmitter and a receiver of a ADSL system in accordance with some embodiments of the present invention.

FIG. 6 is a schematic diagram of an ADSL system according to some embodiments of the present invention. The system includes a transmitter 600, a channel 610 (e.g., a telephone line) and a receiver 620. The transmitter 600 includes a quadrature amplitude modulation (QAM) encoder 601, an inverse fast Fourier transformer (IFFT) 602, a parallel-to-serial converter 603 and a digital-to-analog converter 604. The receiver 620 includes a discrete multitone (DMT) receiver circuit 630 including a filter/analog-to-digital converter (ADC) 621, a time-domain equalizer (TEQ) 622, a first-in-first-out (FIFO) buffer 623, a serial-to-parallel converter 624, a fast Fourier transformer (FFT) 625, a frequency-domain equalizer (FEQ) 627, and a QAM decoder 628. The receiver 620 further includes a synchronization circuit 626. The channel 610 couples the transmitter 600 and the receiver 620, and may include, for example, a transmission line, such as a telephone network, as well as other components that link the transmitter 600 and receiver 620.

A DMT coding technique may be used to provide a plurality of subchannels for transmission of information. Generally, ADSL can provide 256 independent subchannels (or tones), which can be obtained by dividing an interval of 0 kHz to 1.104 MHz into 4.3125 kHz segments, with an "inner band" of 0 kHz to 20 kHz used for POTS. As is well known, each subchannel may be modulated by the QAM encoder 601 and a plurality of bits per each subchannel is applied. These bits are transmitted and received as groups or symbols.

The IFFT 602 converts 256 QAM symbols outputted from the QAM encoder 601 into 512-sample DMT symbols. Parallel DMT symbols produced by the IFFT 602 are converted into serial form by the parallel-to-serial converter 603. The digital-to-analog converter 604 converts the digital samples into analog signals. The analog signals are transmitted over the channel 610 after low-pass filtering by a low pass filter provided within the digital-to-analog converter 604.

In general, in a channel used to transmit data, if an amplitude characteristic (i.e., a gain) and a group delay characteristic of the channel are constant, channel distortion does not significantly influence signals. However, because a real channel typically does not have a constant frequency characteristic, signals may be influenced by channel distortion. If the channel distortion is great, the influence on the signals may also be great. In particular, distortion can cause inter-channel interference (ICI) and inter-symbol interference (ISI).

The filter/ADC 621 of the receiver 620 may receive distorted symbols via the channel 610. In the filter/ADC 621, high-frequency noise is attenuated using a low pass filter, and the filtered DMT symbols are converted into 512 digital samples. These digital samples are provided to the time-domain equalizer 622. The time-domain equalizer 622 reduces interference between symbols of the digital samples, producing a serial sample stream that is sequentially stored in the FIFO buffer 623. As is well known, the FIFO buffer 623 first outputs data first inputted. The FIFO buffer 623 is used in a frame synchronization, as described in detail below.

A serial sample stream outputted from the FIFO buffer 623 is provided to the serial-to-parallel converter 624, which produces 512 samples of symbols in parallel. The serial-to-parallel converter 624 receives and stores the sample stream outputted via the FIFO buffer 623, and it can be constructed with a buffer, which simultaneously outputs the stored samples when the number of the stored samples is 512. The 512 time domain samples are provided to 512-point FFT 625 and converted into frequency-domain symbols by the FFT 625. The frequency-domain symbols are provided to the frequency-domain equalizer 627. The frequency-domain equalizer 627 corrects amplitude and phase distortion imparted by the channel 610, and provides the corrected symbols to the QAM decoder 628. The QAM decoder 628 performs a QAM decoding of the input data and outputs received data RD.

The transmitter 600 (e.g., a transmitter of an ADSL central office according to ADSL Annex C) may generate hyperframes synchronized with a TTR signal during the communication initialization process and may transmit the hyperframes by applying phase information according to positions in the hyperframe of the respective symbols with respect to the TTR indication signal (i.e., $48^{th}$ tone). During a NEXT period of the hyperframe, the phase of the TTR indication signal has a +45° phase and, during the FEXT period of the hyperframe, the TTR indication signal has a −45° phase. In the initialization process, the synchronization circuit 626 contained in the receiver 620 (e.g., of a remote terminal) analyzes the TTR indication signal received from the ADSL central office via the channel and controls the receiver 620 such that it operates in synchronization with the hyperframe transmitted from the transmitter 600. Operation of the synchronization circuit 626 is described in greater detail below.

Communication initialization for the ADSL central office 220 and the ADSL remote terminal 222 typically is carried out when power supplied to the transmitter of the ADSL central office 220 or the transmitter of the ADSL remote terminal 222 is cut off and then re-supplied and/or or when communication between the central office and an ADSL modem installed in subscriber's house is stopped and then restarted. In general, the initialization process includes an acknowledgment of activation and initialization requests, a transceiver training for both the central office and the subscriber terminal, an exchange of a rate request between the central office and the subscriber terminal, a channel analysis, and an exchange of a transmitter setup information (e.g., a bit allocation table) between the central office and the subscriber terminal. According to Annex C, the central office 220 acknowledges an initialization request during the initialization process and then outputs the TTR indication signal. The ADSL remote terminal 222 analyzes the TTR indication signal, classifies whether the symbols transmitted from the central office 220 are the FEXT symbols or the NEXT symbols, and then performs hyperframe synchronization. Ideally, the receiver 620 would receive hyperframe information starting from a first frame of the hyperframe. This generally is not feasible using conventional techniques. However, According to some embodiments of the present invention, a receiver (such as the receiver 620 of FIG. 6) can achieve frame synchronization based on the phase of the TTR indication signal ($TTR_{13}$ I).

Figure 7:
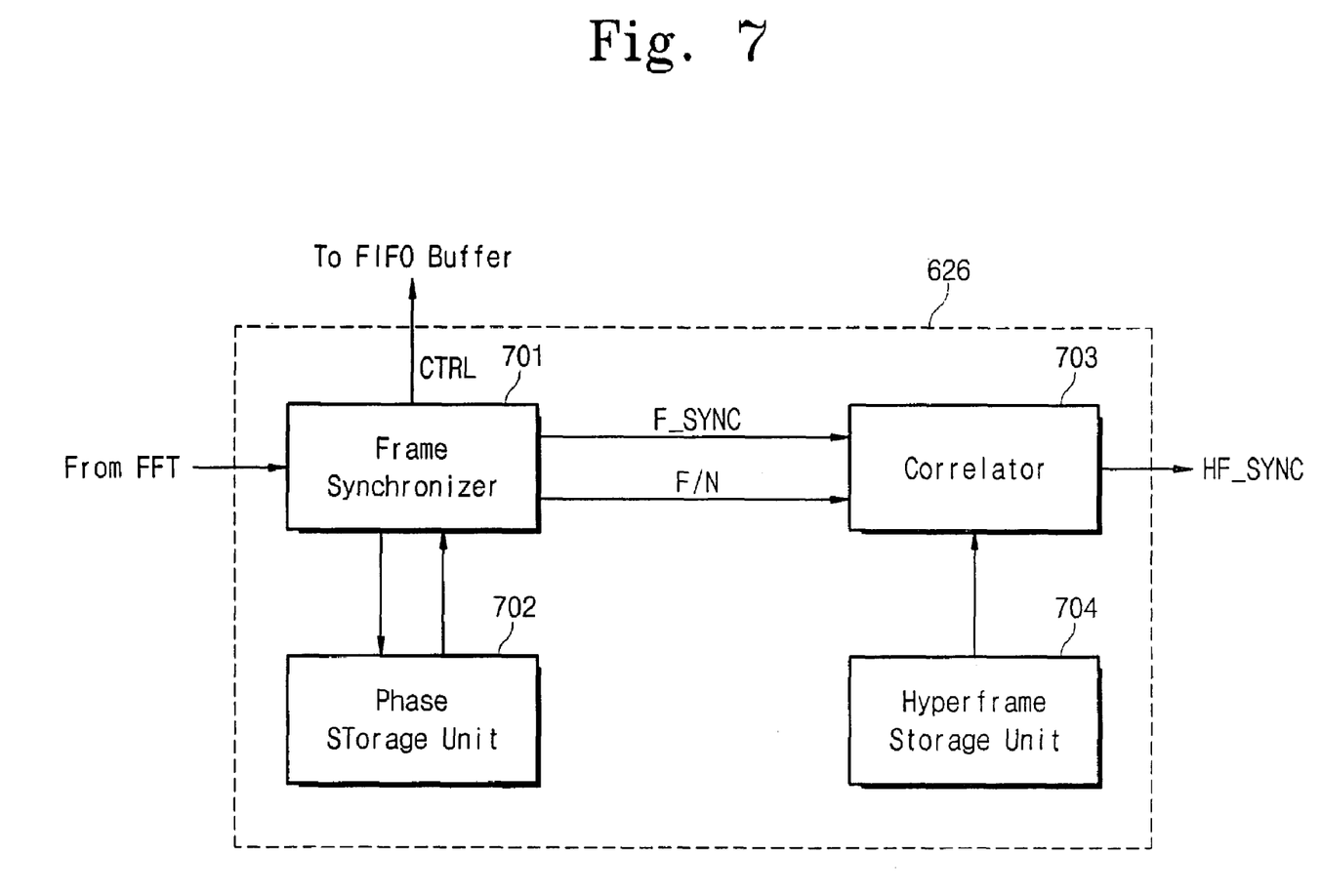
FIG. 7 is a view showing a detailed structure of the synchronization circuit of FIG. 6 according to further embodiments of the present invention.

FIG. 7 is a view showing a detailed structure of the synchronization circuit 626 of FIG. 6 according to some embodiments of the present invention. The synchronization circuit 626 includes a frame synchronizer 710, a phase storage unit 720, a correlator 703 and a hyperframe storage unit 704.

Figure 8:
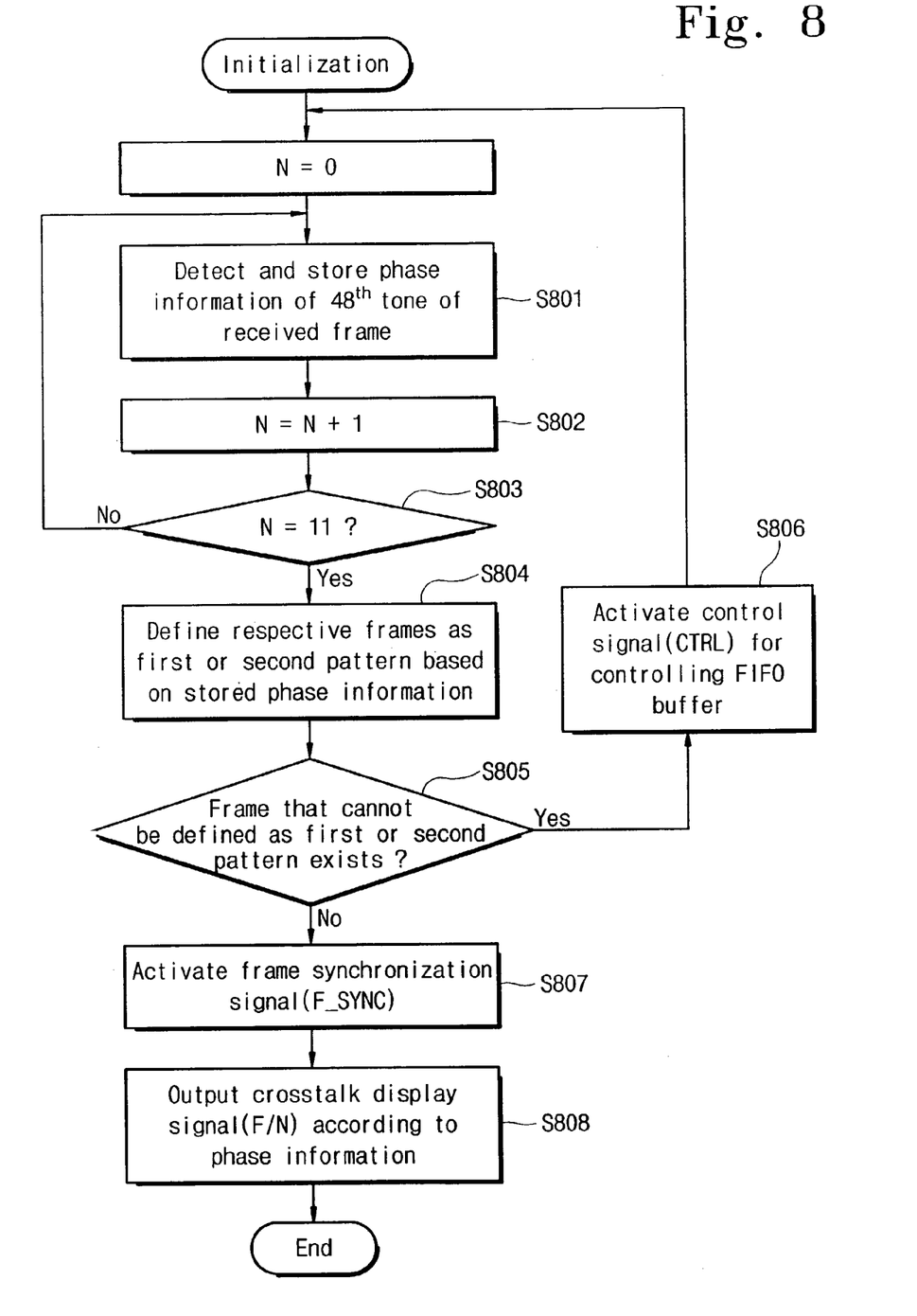
FIG. 8 is a flowchart showing a frame synchronization process in the synchronization circuit of FIG. 7 in accordance with further embodiments of the present invention.
Figure 9:
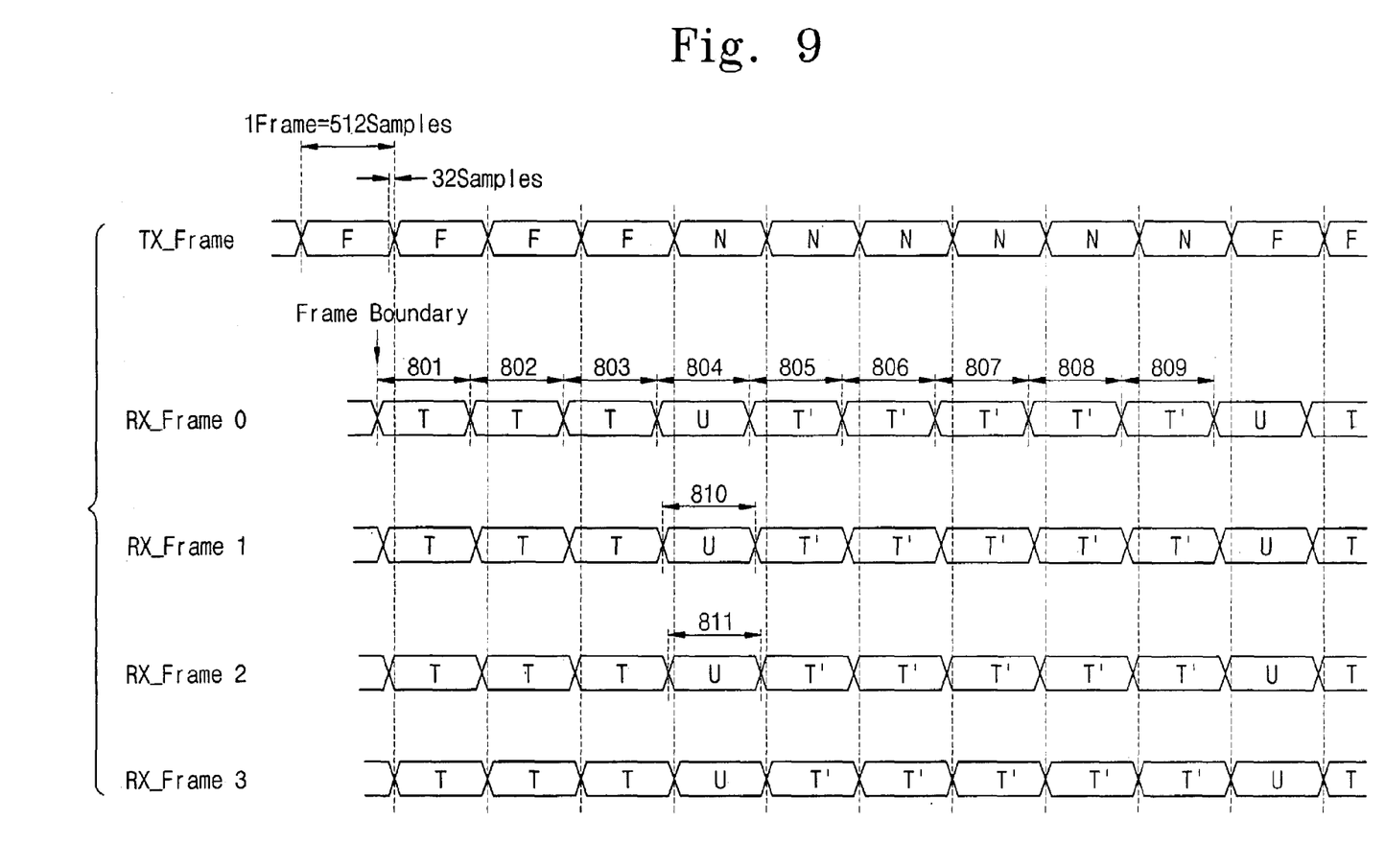
FIG. 9 illustrates a frame synchronization process according to some embodiments of the present invention.

FIG. 8 is a flowchart showing exemplary frame synchronization operations for the synchronization circuit 626 of FIG. 7 in accordance with further embodiments of the present invention, and FIG. 9 is a corresponding timing diagram for such operations. Referring to FIG. 8 in conjunction with FIG. 7, in step S800, the frame synchronizer 701 sets a value N of an internal counter (not shown) to '0'. The value N of the internal counter is increased by "1" each time a number of samples corresponding to a frame is received. In step S801, the frame synchronizer 701 detects phase information of the $48^{th}$ tone (i.e., the TTR indication signal (TTR_I)) outputted from the FFT 625 and stores the detected phase information in the phase storage unit 702. In step S802, the value N of the internal counter is increased by "1." In step S803, the frame synchronizer 701 determines whether or not the value N of the internal counter is "11." If the value N of the internal counter is not "11," the process returns to the step S801. If the value N of the internal counter is "11," the process proceeds to step S804, with TTR phase information for 11 frames worth of samples being stored in the phase storage unit 702.

In step S804, the frame synchronizer 701 classifies the groups of samples (i.e., candidate frames) using the phase information stored in the phase storage unit 702. In particular, the TTR indication signal ($TTR\_I_R$) transmitted from the transmitter 600 includes +45° phase information representing a FEXT period or −45° phase information representing a NEXT frame. In a transmission pattern TX_Frame of FIG. 9, "F" represents an FEXT period and "N" represents a NEXT period.

Exemplary operations for defining frames in the frame synchronizer 701 will now be described with reference to FIG. 9. The TTR indication signal (TTR_I) received by the receiver 620 includes first and second phase information which are not +45° or −45° with respect to the frame boundary. Based on the phase information stored in the phase storage unit 702, the frame synchronizer 701 defines the respective 11 groups of samples as either a first type T or a second type T'.

For example, as shown in FIG. 9, a series of candidate frames 801-803 having the same phase are classified as being of a first type T, while candidate frames 805-809 having a different phase from the frames 801-803 are classified as being of a second type T'. Because the FEXT phase and the NEXT phase transmitted from the transmitted from the transmitter 600 both occur in the frame 804, the frame 804 cannot be classified as being of either type T or type T'. Such a candidate frame is defined as a third type U. This results in a reception pattern RX_Frame0 as shown in FIG. 9.

Referring again to FIG. 8, the reason that the synchronizer 701 determines whether or not the value N of the internal counter is '11' is to know whether a frame cannot be classified into the first pattern T or the second pattern T'. It will be appreciated that it is possible to change values that are compared with the value N of the internal counter within the scope of the present invention. In step S805, referring to the reception pattern RX_Frame0, the frame synchronizer 701 determines whether or not a candidate frame should be classified as type U, e.g., as shown in FIG. 9, the frame 804 is classified into the third pattern U. If a frame is classified as type U, the process proceeds to step S806.

In step S806, a control signal CTRL for controlling the FIFO buffer 623 is activated so as to change the frame boundary. Respective symbols (frames) received via the channel 610 are constituted from 512 samples. In other words, one period of the PILOT tone (i.e., the $64^{th}$ tone), whose frequency is 276 kHz, includes 512/64(=10.666667) samples, and one period of TTR indication tone (i.e., $48^{th}$ tone) is synchronized to every $32^{nd}$ sample, which are the least common multiple (LCM) of 8 and 10.666667. Therefore, in order not to change the phases of both the PILOT tone and the TTR indication tone, a position starting to receive the reception signal is moved by 32 samples.

If the control signal CTRL outputted from the frame synchronizer 701 is activated, the FIFO buffer 623 removes 32 samples, which correspond to 4 periods of the PILOT tone and 3 periods of the TTR indication tone (TTR_$I_R$), and outputs data after the removed data. In other words, the frame boundary for samples output from the FIFO buffer 623 is shifted.

After the step S806, the process returns to the step S800, in which the value N of the internal counter is again initialized and the above-described steps are repeated. As a result, a reception pattern RX_Frame1 is determined by the frame synchronizer 701 as shown in FIG. 9. As shown in FIG. 9, because the reception pattern RX_Frame1 includes the type U candidate frame 810, the FIFO buffer 623 again shifts the frame boundary by 32 samples.

Again in the step S800, the value N of the internal counter is initialized and the above-described steps are repeated. As a result, a reception pattern RX_Frame2 is determined by the frame synchronizer 701. As the pattern RX-Frame2 still includes an unknown (type U) type candidate frame 811, the FIFO buffer 623 again shifts the frame boundary by 32 samples.

Again in the step S800, the value N of the internal counter is initialized and the above-described steps are repeated. As a result, as shown in FIG. 9, a reception pattern RX_Frame3 that does not include a type U frame is produced, i.e., frame synchronization is achieved. Therefore, after the step S805, the process proceeds to step S807.

In step S807, the frame synchronizer 701 activates a frame synchronization signal F_SYNC. In step S808, the frame synchronizer 701 determines whether a present received frame is an FEXT frame or an NEXT frame using the phase information provided from the FFT 625, and outputs a crosstalk type indication signal F/N according to the determination result. For example, the crosstalk type indication signal F/N may be output by determining whether the present received frame is type T or type T'.

The above-described technique can correctly determine whether a received frame is a FEXT frame or a NEXT frame. According to the activation of the frame synchronization signal F_SYNC, the correlator 703 compares the crosstalk signal provided from the frame synchronizer 701 with a hyperframe stored in the hyperframe storage unit 705, and determines a sequence number of the present received frame in the hyperframe. If the correlator 703 finds the sequence number of the present received frame, the internal counter counts up the value to activate the hyperframe synchronization signal HF_SYNC at a hyperframe boundary, i.e., a position in which the last frame is placed.

Responsive to the activation of the hyperframe synchronization signal HF_SYNC, the hyperframe synchronization is completed, and a training process (i.e., an initialization process of the ADSL system) is carried out. After achieving the hyperframe synchronization, the ADSL central office 220 and the ADSL remote terminal 222 can transmit/receive a large amount of data during the FEXT period and can transmit/receive a small amount of data during the NEXT period so as to reduce negative effects of crosstalk interference. In the above-described embodiments, frame synchronization can be achieved using a simple method of moving the position in which the received signal is received by 32 samples, without changing the phase of the PILOT tone and/or the TTR indication tone.

Figure 10:
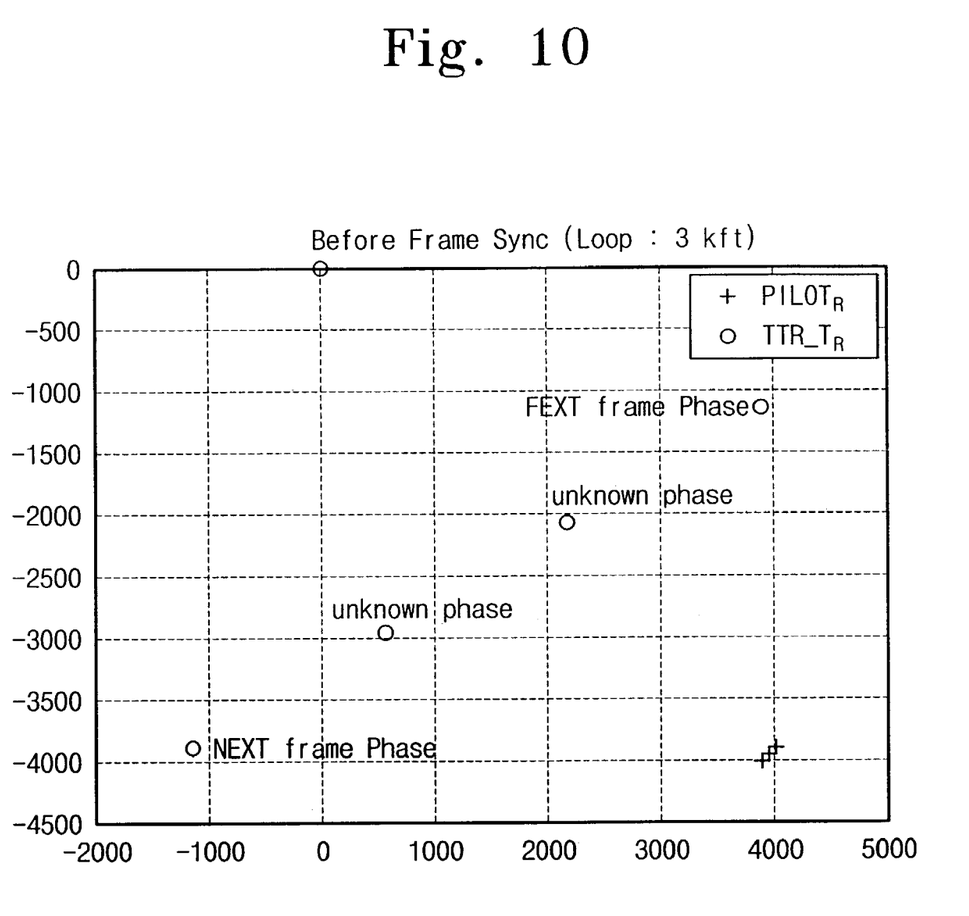
FIG. 10 shows phases of a TTR indication signal outputted by a fast Fourier transform (FFT) before a receiver performs frame synchronization according to some embodiments of the present invention.

FIG. 10 shows the phases of the TTR indication signal TTR_$I_R$ outputted from the FFT 625 before the receiver 620 performs the frame synchronization. As described above, the phases of the TTR indication signals (TTR_$I_R$) include a first phase during a FEXT period and a second phase during a NEXT period. However, when the receiver 620 receives the signal received from a reception starting position (SP0), the phases of frames outputted from the FFT 625 include phases between the first and second phases, in addition to the first and second phases, as shown in FIG. 10.

Figure 11:
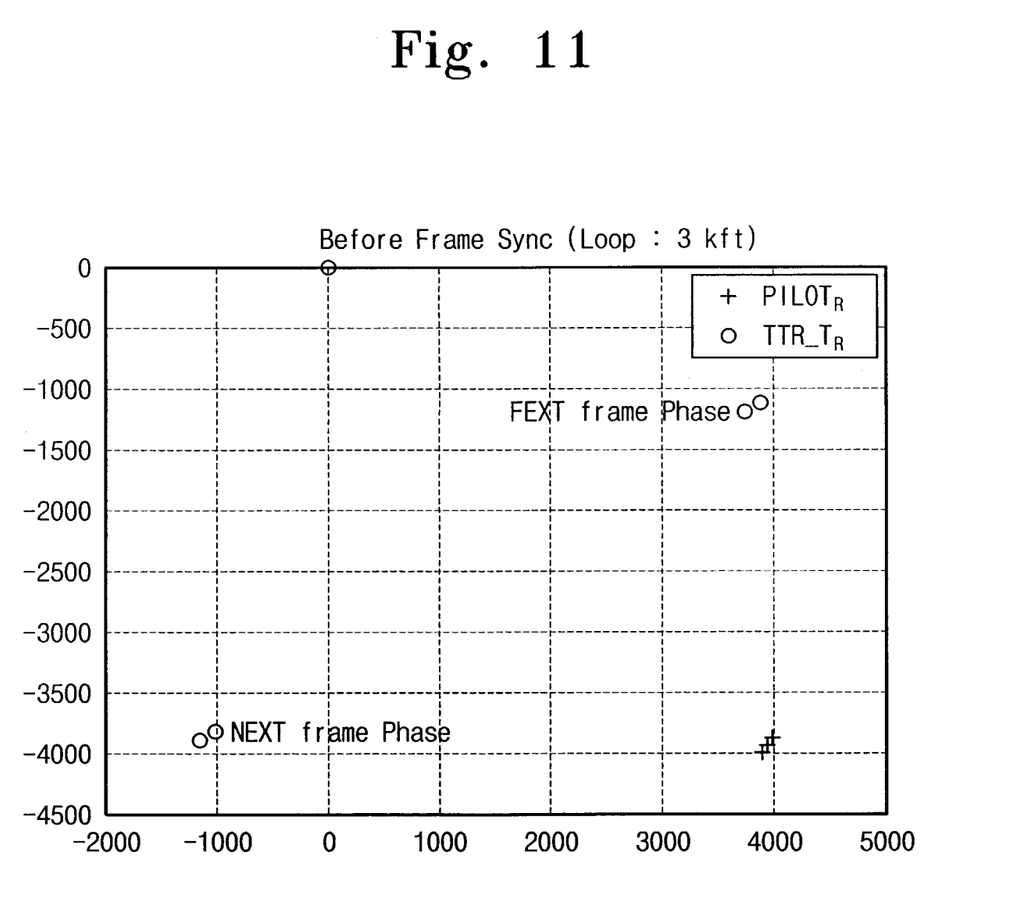
FIG. 11 shows phases of a TTR indication signal outputted from an FFT after completing a frame synchronization process in accordance with further embodiments of the present invention.

FIG. 11 shows the phases of the TTR indication signal TTR_$I_R$ outputted from the FFT 625 after completing the frame synchronization process in accordance with embodiments of the present invention. If the hyperframe is synchronized by moving the reception position of the received signal by 32 samples so that the phase of the $48^{th}$ tone (i.e., the PILOT signal PILOT$_R$) is not changed, the phase of the TTR indication signal TTR_$I_R$ output from the FFT 625 are the first phase corresponding to the NEXT period and the second phase corresponding to the FEXT period. According to embodiments of the present invention, hyperframe synchronization can be achieved during the initialization process of the communication system which transmits/receives signals via the digital subscriber line (DSL) in the same cable bundle as a communication line used for a TCM-ISDN system.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A digital subscriber line (DSL) receiver, comprising:
   means for a discrete multitone (DMT) receiver circuit operative to receive a DSL signal and to generate signal samples corresponding to respective frequency division multiplexed tones of the DSL signal; and
   means for a synchronization circuit operative to determine phase information for a crosstalk source indication signal carried by one of the plurality of frequency-division multiplexed tones from the signal samples generated by the DMT receiver circuit and to determine frame timing for the DSL signal responsive to the determined phase information;
wherein the DMT receiver circuit comprises:
  a buffer that operative to receive and store samples of the DSL signal; and
    a fast Fourier transformer (FFT) operative to generate the signal samples for the respective ones of the plurality of frequency-division multiplexed tones from the stored samples of the DSL signal;
  wherein the means for a synchronization circuit are operative to control transfer of stored samples of the DSL signal from the buffer to the FFT responsive to the determined phase information; wherein the DMT receiver circuit comprises a serial-to-parallel converter that converts stored samples of the DSL signal from a serial data stream to a parallel data stream, and that provides the parallel data stream to the FFT.

2. A digital subscriber line (DSL) receiver, comprising:
means for a discrete multitone (DMT) receiver circuit operative to receive a DSL signal and to generate signal samples corresponding to respective frequency division multiplexed tones of the DSL signal; and
means for a synchronization circuit operative to determine phase information for a crosstalk source indication signal carried by one of the plurality of frequency-division multiplexed tones from the signal samples generated by the DMT receiver circuit and to determine frame timing for the DSL signal responsive to the determined phase information; wherein the DMT receiver circuit comprises:
a buffer that operative to receive and store samples of the DSL signal; and
  a fast Fourier transformer (FFT) operative to generate the signal samples for the respective ones of the plurality of frequency-division multiplexed tones from the stored samples of the DSL signal;
wherein the means for a synchronization circuit are operative to control transfer of stored samples of the DSL signal from the buffer to the FFT responsive to the determined phase information; wherein the synchronization circuit is operative to apply a control signal to the buffer to selectively skip transfer of a predetermined number of stored samples of the DSL signal from the buffer to the FFT responsive to the determined phase information.

3. A DSL receiver according to claim 2, wherein the crosstalk source indication signal comprises an integrated digital services network (ISDN) timing reference indication signal.

4. A DSL receiver according to claim 2, wherein the predetermined number of samples is a least common multiple of a number of samples corresponding to a period of an ISDN timing reference signal and a number of samples corresponding to a period of a DSL pilot tone.

5. A DSL receiver according to claim 2:
wherein the means for a synchronization circuit are operative to classify a frame-sized group of signal samples generated by the FFT based on phase information for the ISDN timing reference indication signal present in the frame-sized group of samples, and to assert the control signal responsive to detecting that the frame-sized group of samples has phase information for the ISDN timing reference indication signal therein corresponding to more than one phase value; and
wherein the buffer is operative to skip transfer of the predetermined number of samples from the buffer to the FFT responsive to assertion of the control signal.

6. A DSL receiver according to claim 5, wherein the means for a synchronization circuit are operative to detect phase information for a set of frame-sized groups of signal samples generated by the FFT, and to assert the control signal responsive to detection that the set includes a frame-sized group of signal samples that has phase information for the ISDN timing reference indication signal therein corresponding to more than one phase value.

7. DSL receiver according to claim 6, wherein the means for a synchronization circuit are further operative to detect frame synchronization responsive to detection that the set includes no frame-sized group of signal samples that has phase information for the ISDN timing reference indication signal therein corresponding to more than one phase value.

8. A DSL receiver according to claim 7, wherein the means for a synchronization circuit are further operative to detect DSL hyperframe timing responsive to detection of frame synchronization.

9. A digital subscriber line (DSL) receiver, comprising:
means for a discrete multitone (DMT) receiver circuit operative to receive a DSL signal and to generate signal samples corresponding to respective frequency division multiplexed tones of the DSL signal; and
means for a synchronization circuit operative to determine phase information for a crosstalk source indication signal carried by one of the plurality of frequency-division multiplexed tones from the signal samples generated by the DMT receiver circuit and to determine frame timing for the DSL signal responsive to the determined phase information; wherein the DMT receiver circuit comprises:
a buffer that operative to receive and store samples of the DSL signal; and
  a fast Fourier transformer (FFT) operative to generate the signal samples for the respective ones of the plurality of frequency-division multiplexed tones from the stored samples of the DSL signal;
wherein the means for a synchronization circuit are operative to control transfer of stored samples of the DSL signal from the buffer to the FFT responsive to the determined phase information; wherein the synchronization circuit is operative to receive signal samples from the FFT, to detect phase information for the ISDN timing reference indication signal from the received signal samples, to generate a frame synchronization indication signal and a crosstalk type indication signal responsive to the detected phase information, to detect a frame sequence number from the received signal samples responsive to the frame synchronization indication signal and the far-end/near-end frame indication signal, and to determine a hyperframe boundary based on the detected frame sequence number.

10. A DSL receiver according to claim 9, wherein the means for a synchronization circuit comprise:
a frame synchronizer operative to receive signal samples from the FFT, to detect phase information for the ISDN timing reference indication signal from the received signal samples, and to generate the frame synchronization indication signal and the crosstalk type indication signal responsive to the detected phase information; and
a correlator operative to detect a frame sequence number from the received signal samples responsive to the frame synchronization indication signal and the far-end/near-end frame indication signal, and to determine a hyperframe boundary based on the detected frame sequence number.

11. A digital subscriber line (DSL) receiver, comprising:
means for a decoder that converts time domain signals into frequency domain signals;
means for a buffer that provides the decoder with signals received via a digital subscriber line along a frame boundary; and
means for a frame synchronizer for determining whether or not a frame synchronization is achieved using phase information produced by the decoder,
wherein the means for a frame synchronizer change the frame boundary when the frame synchronization is not achieved, wherein the signals received via the digital subscriber line include a TTR indication signal and a PILOT signal, and wherein the frame boundary is changed by a least common multiple (LCM) of a period of the TTR indication signal and a period of the PILOT signal.

12. The receiver of claim 11, wherein the phase information produced by the decoder is phase information for the TTR indication signal.

13. The receiver of claim 11, wherein the means for a frame synchronizer determine that frame synchronization is achieved when the series of phase information corresponds to any one of a phase corresponding to a far end crosstalk (FEXT) period and that corresponding to a near and crosstalk (NEXT) period.

14. The receiver of claim 11, wherein the means for a buffer comprise a first-in-first-out (FIFO) buffer.

15. A digital subscriber line (DSL) receiver, comprising:
means for an analog-to-digital converter that converts analog signals to digital signals;
means for a first buffer that receives and stores the digital signals produced by the analog-to-digital converter and sequentially outputs serial digital signals in the stored order in synchronization with frame boundaries;
means for a second buffer that converts serial digital signals produced by the first buffer into parallel digital signals;
means for a fast Fourier transformer that converts the parallel digital signals produced by the second buffer into frequency domain signals; and
means for a frame synchronization circuit that receives and stores phase information produced by the fast Fourier transformer and that performs a frame synchronization using the stored phase information,
wherein the means for a frame synchronization circuit adjust a frame boundary if at least one among the series of phase information corresponds to neither a phase corresponding to a far end crosstalk (FEXT) period nor a phase corresponding to a near and crosstalk (NEXT) period.

16. The receiver of claim 15, wherein the means for a frame synchronization circuit include:
a phase storage unit; and
a frame synchronizer for storing the series of phase information outputted from the fast Fourier transformer into the phase storage unit, and controlling the frame boundary to be changed, if at least one among the series of phase information corresponds to neither a phase corresponding to a far end crosstalk (FEXT) period nor that corresponding to a near and crosstalk (NEXT) period.

17. The receiver of claim 16, wherein the signal received via the digital subscriber line includes TTR indication signal and PILOT signal.

18. The receiver of claim 17, wherein the means for a frame boundary are changed by the least common multiple (LCM) of a period of the TTR indication signal and that of the PILOT signal.

19. A method of operating a digital subscriber line (DSL) receiver, the method comprising:
receiving a DSL signal;
generating signal samples corresponding to respective frequency division multiplexed tones of the DSL signal;
determining phase information for a crosstalk source indication signal carried by one of the plurality of frequency-division multiplexed tones from the signal samples generated by the DMT receiver circuit; and
determining frame timing for the DSL signal responsive to the determined phase information;
wherein generating signal samples corresponding to respective frequency division multiplexed tones of the DSL signal comprises:
storing samples of the DSL signal; and
fast Fourier transforming the stored samples of the DSL signal to generate the signal samples for the respective ones of the plurality of frequency-division multiplexed tones;
wherein determining frame timing for the DSL signal comprises selectively transferring stored samples of the DSL signal for fast Fourier transforming responsive to the determined phase information; and
wherein selectively transferring stored samples of the DSL signal comprises applying a control signal to a buffer that stores the samples of the DSL signal to selectively skip transfer of a predetermined number of stored samples of the DSL signal from the buffer to a fast Fourier transformer (FFT) responsive to the determined phase information.

20. A method according to claim 19, wherein the crosstalk source indication signal comprises an ISDN timing reference indication signal.

21. A method according to claim 19; wherein the predetermined number of samples is a least common multiple of a number of samples corresponding to a period of an ISDN timing reference signal and a number of samples corresponding to a period of a DSL pilot tone.

22. A method according to claim 19;
wherein applying a control signal to a buffer that stores the samples of the DSL signal to selectively skip transfer of a predetermined number of stored samples of the DSL signal from the buffer to a fast Fourier transformer (FFT) comprises:
classifying a frame-sized group of signal samples generated by the FFT based on phase information for the ISDN timing reference indication signal present in the frame-sized group of samples; and
asserting the control signal responsive to detecting that the frame-sized group of samples has phase information for the ISDN timing reference indication signal therein corresponding to more than one phase value; and
wherein the buffer is operative to skip transfer of the predetermined number of samples from the buffer to the FFT responsive to assertion of the control signal.

23. A method according to claim 22; wherein applying a control signal to a buffer that stores the sample of the DSL signal to selectively skip transfer of a predetermined number of stored samples of the DSL signal from the buffer to a fast Fourier transformer (FFT) comprises:

detecting phase information for a set of frame-sized groups of signal samples generated by the FFT; and asserting the control signal responsive to detection that the set includes a frame-sized group of signal samples that has phase information for the ISDN timing reference indication signal therein corresponding to more than one phase value.

24. A method according to claim 23, further comprising detecting frame synchronization responsive to detection that the set includes no frame-sized group of signal samples that has phase information for the ISDN timing reference indication signal therein corresponding to more than one phase value.

25. A method according to claim 24, further comprising detecting DSL hyperframe timing responsive to detection of frame synchronization.

26. A frame synchronization method for a receiver that receives frame signals via a digital subscriber line disposed adjacent to a communication line of TCM-ISDN receiver, the frame synchronization method comprising:
   (a) sequentially receiving a plurality of frames from a frame boundary; (b) detecting phase information for a TTR indication signal contained in the respective received frames;
   (c) determining whether or not, among the detected phase information, there is phase information which corresponds to neither a phase corresponding to a far end crosstalk (FEXT) period nor that corresponding to a near and crosstalk (NEXT) period;
   (d) if there is the phase information which corresponds to neither a phase corresponding to a far end crosstalk (FEXT) period nor that corresponding to a near and crosstalk (NEXT) period, controlling the frame boundary to be changed by a predetermined time; and
   (e) repeating the steps (a) to (d) until all the detected phase information correspond to any one of a phase corresponding to a far end crosstalk (FEXT) period and that corresponding to a near and crosstalk (NEXT) period.

27. The frame synchronization method of claim 26, wherein the respective frames include TTR indication signal and PILOT signal.

28. The frame synchronization method of claim 27, wherein, in the step (d), the frame boundary is changed by the least common multiple (LCM) of a period of the TTR indication signal and that of the PILOT signal.

29. A frame synchronization method for a communication system having a plurality of frames and performing a communication via a digital subscriber line disposed adjacent to a communication line of a TCM-ISDN system, the frame synchronization method comprising the steps of:
   (a) sequentially receiving the plurality of frames from a frame boundary;
   (b) storing phase information of TTR indication signal contained in the respective received frames;
   (c) defining the respective frames as any one of first and second types based on the stored phase information;
   (d) determining whether or not, among the frames, there is a frame that is not defined as the first and second types;
   (e) if there is the frame which is not defined as any one of the first and second types, changing the frame boundary by a predetermined time; and
   (f) repeating the steps (a) to (e) until all the frames are defined as any one of the first and second types.

30. The frame synchronization method of claim 29, further comprising the step of activating a frame synchronization signal when all the frames are defined as any one of the first and second types.

31. The frame synchronization method of claim 30, wherein the first type corresponds to a far end crosstalk (FEXT) period, and the second type corresponds to a near end crosstalk (NEXT) period.

* * * * *